Nov. 11, 1952  W. H. KUNTZ  2,617,506
VARIABLE DRAG COUPLING
Filed Sept. 22, 1951  2 SHEETS—SHEET 1

INVENTOR.
WILLIAM H. KUNTZ
BY Russell C. Lane
ATTORNEY

Nov. 11, 1952     W. H. KUNTZ     2,617,506
VARIABLE DRAG COUPLING

Filed Sept. 22, 1951     2 SHEETS—SHEET 2

INVENTOR.
WILLIAM H. KUNTZ
BY Russell C. Lane
ATTORNEY

Patented Nov. 11, 1952

2,617,506

UNITED STATES PATENT OFFICE 2,617,506

VARIABLE DRAG COUPLING

William H. Kuntz, Dayton, Ohio

Application September 22, 1951, Serial No. 247,777

9 Claims. (Cl. 192—8)

This invention relates to controls and linkage between an actuator or drive member and a load member, and provides for selective reversible irreversibility.

This invention relates to mechanical devices for the transmission of power from an input shaft to an output shaft having a one-to-one transmission ratio. The arrangement is such that by selection, the device may be set for reversibility or irreversibility. When set for reversibility, the device acts only as a coupling between the input shaft and output shaft, so that power can be put into either shaft and work taken off the other shaft. When set for irreversibility, the device acts to transmit power only from the input shaft to the output shaft at high efficiency (approximately 98%) but power cannot be transmitted from the output shaft to the input shaft. In other words, the output shaft is locked against rotation which might be caused by the load torque when the drive torque is relaxed. The device is a variable drag coupling that might be designated as related to overrunning clutches, crane hoist brakes, free wheeling devices, and mechanisms wherein selected braking action may be achieved when the load member attempts to reverse direction, driving the drive member when the driving force is relaxed, or reversed.

The coupling of the instant disclosure, while designed primarily for continuous rotary movement, can be adapted for cable and drum input with linear movement in the output as disclosed in my copending application for Irreversible Control Linkage, S. N. 199,040, filed December 4, 1950, and therefor constitutes an improvement thereover.

The foremost object of this invention is to provide a device having the above characteristics according to the requirements of many types of applications and purposes of the device.

One object of the invention is to eliminate sliding friction between coupled members when the irreversible condition is obtaining and a heavy load is acting at very high stress relationship. Otherwise, there may be undesirable wear, scoring and the like. This is accomplished by adopting a relatively non-movable relation or connection between the drive member and the load member and shifting the point of sliding friction to a location outside the driver-load connection.

Another object of the invention is to enlarge the angle of normal force, that is, the angle between the direction of force of the reversing load and the direction of the resulting force normal to the point of application of the reversing load. This produces a magnification of the reversing load increasing the friction of the bearing surface making the brake action more effective. Power transmission efficiency approaches unity by mounting one of the elements of the frictional union on antifriction bearings.

Further objects and advantages of the present invention will be apparent from the following description reference being had to the accompanying drawings wherein a preferred embodiment of the present invention is herein described.

Figure 2:
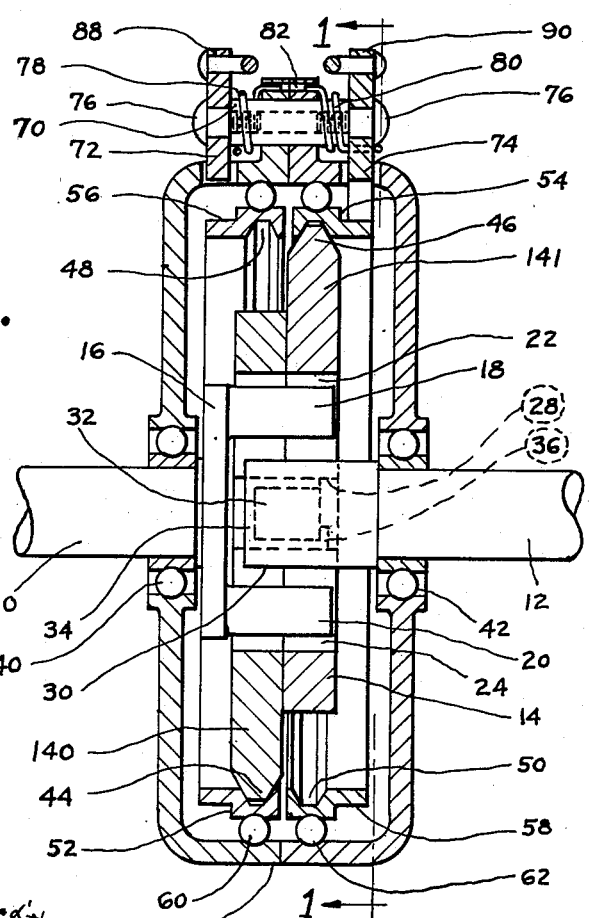
Fig. 2 is a longitudinal sectional view substantially as indicated by the line and arrows 2—2 of Fig. 1.

Referring to Fig. 2 of the drawings, 10 refers to a power input member such as a drive shaft, and 12 refers to an output member such as a load shaft; the two shafts being operatively coupled in an articulated manner by the manner 14 which for convenience of nomenclature I shall term a circular slide. The drive shaft 10 has a head 16 provided with two drive pins 18 and 20 extending axially to be received in diametrically arranged notches 22 and 24 of the circular slide. The circular slide 14 has a central aperture 26 that joins the radial notches 22, 24 and opens to a single radial notch 28 disposed in the plate of the slide and arranged at substantially right angles to the first said notches. Generally aligned with the drive member 10 is the load member 12 whose head 30 is generally centered in the aperture 26 and has a radially extending arm 32 extending into the radial notch 28 to effect driving relation between the circular slide 14 and load shaft 12.

Figure 1:
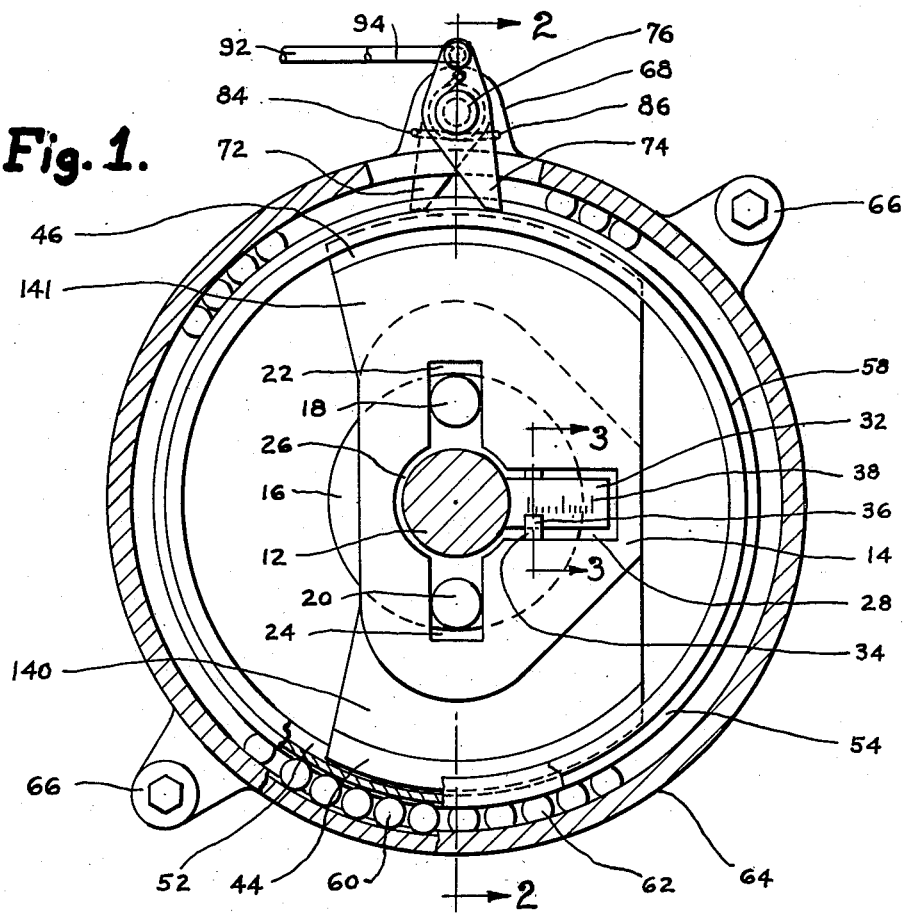
Fig. 1 is an elevational view of my improved coupling with one of the cover plates removed, being substantially as indicated by the line and arrows 1—1 of Fig. 2.
Figure 3:
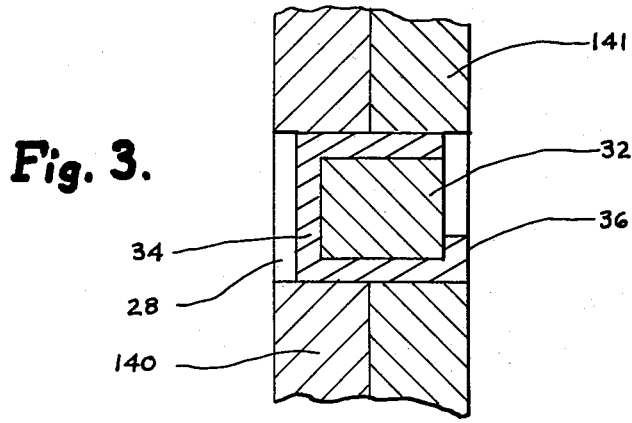
Fig. 3 is a detail in section substantially as indicated by the line and arrows 3—3 of Fig. 1.

As shown in Figs. 1 and 2 the actual contacting of the elements 14 and 32 is made through a load band 34 embracing the arm 32 and slidable along the extent of the notch 28 and of the arm within the slot or notch 28 for selectively varying the length of the moment arm by which the forces are transmitted from one member to the other. For convenience in setting, a lip 36 on the load band may provide an arrow or index mark cooperable with a scale 38 on the face of the arm 32. If the load band is moved outward on the arm 32 toward the right as shown in Fig. 1, the forces between the members 14 and 32 will be transmitted through a longer moment arm than that illustrated.

Thus far it should be apparent that any driving force applied to the shaft 10 is readily transmitted to the load shaft 12 without undue loss, and in a ratio of 1:1. The engaging relation between the drive pins 18, 20 and the notches 22, 24 of the member 14 is such that only pure torque is transmitted to the circular slide 14, and no radial load is imposed thereon. However, with respect to the engaging relation between the slide 14 and the load arm 32 through the load band 34, the load band is movable along the arm to selectively vary the moment arm through which the torque is applied thus resulting in a variable radial load associated with the torque. The slide 14 thus far may be considered as a simple coupling member between the shafts 10 and 12, which insures that they will be maintained in relatively non-movable angular relation, yet introduces such tolerances that the shafts 10 and 12 need not be exactly aligned in their bearings 40 and 42. Rotation of either shaft 10 or 12 will effect 100% rotation of the other.

While I have shown the drive member 10 and the load member 12 as capable of continuous rotation, it is to be understood that either might be replaced by drum and cable or the like if a different type of motion is wanted. If reciprocatory or oscillatory motion is to be adopted in either the input side or the output side, the terminal may end in a link and pin suitably attached to the head 16 or the arm 32.

The variable drag feature of the coupling here includes a frictional support union at the periphery of the circular slide 14, somewhat as shown in Fig. 2. The slide 14 is conveniently made up of two plate members 140 and 141 in overlapping relation at the central region providing the notches and apertures 22, 24, 28 and 26, in coincidence when the members are rigidly secured together. The peripheral portion of the members 140 and 141, which are circular with respect to the axes of rotation, have wedge shaped edges 44 and 46 respectively, that engage each within a V-groove 48 and 50 of a pair of rings 52 and 54. Both of the rings 52, 54 have brake bands 56 and 58 respectively and are supported by antifriction bearings 60 and 62 provided by a housing or support member 64, which may be fixed against rotation by lugs or ears 66.

Mounted on the housing 64 there is a support lug 68 apertured to receive a stud shaft 70 which pivotally supports brake arms 72 and 74. The brake arms may be pivotally supported by shouldered screws 76 passing therethrough and threaded into the end of the shaft 70, while springs 78 and 80 wound about the shaft with anchorage at one end in a bore 82 of lug 68 have their other ends hooked over one edge of the brake arms as indicated at 84 and 86. The brake arms 72 and 74 are thereby so urged by the springs 78 and 80 respectively that each is yieldably engaged with a brake band 56 or 58, and provide one-way, cam ratchet type brakes which prevent rotation of the associated ring in one direction only, being opposite for the two rings. As viewed in Fig. 1, the brake arm 72 engages brake ring 56 and prevents clockwise rotation of the ring 52, while the brake arm 74 engages the brake ring 58 and thereby prevents counterclockwise rotation of the ring 54. Means are provided for control of the brake engagement by extending the brake arms beyond their pivots 76 to provide apertured ears 88 and 90 to which are secured control rods 92 and 94 which may be actuated to rotate the brake arms against the urge of the respective springs and disengage the brakes so that either of the rings 52 and 54, or both of them, may rotate freely in either direction within their bearings 60, 62.

In operation the variable drag clutch as shown has the drive shaft 10 through which power is applied to the mechanism, and the load shaft 12 which is the output. The connection between the two shafts is obtained by means of the circular slide 14 engaged by the drive shaft 10 through two pins 18, 20, and engaging the adjustable load band 34 carried by the arm 32 of the load shaft 12. The drive pins transmit pure torque to the slides, and the slides transmit torque associated with a radial load to the load band, providing means whereby torque applied by the drive shaft may be transmitted to the load shaft, and vice versa. The circular slides 14 are mounted rotatably within friction rings 52, and 54, which in turn are mounted within antifriction bearings 60, 62, the friction rings being selectively arrested by manually controlled brakes which when engaged prevent rotation of a friction ring in one direction. Friction ring 52 as viewed in Fig. 1, is free to rotate in a counterclockwise direction but not in a clockwise direction when the brake 72 is engaged. Likewise, friction ring 54 is free to rotate in a clockwise direction but not in a counterclockwise direction when the brake 74 is engaged.

If both brakes are disengaged, then both friction rings are free to rotate in either direction, and power may be transmitted from one shaft to the other with very little frictional resistance. If both of the brakes are engaged the friction rings will be locked against rotation in a given direction, and, depending upon the direction of torque applied to one shaft, rotation of the other is effected by sliding movement of the circular slide within one of the friction rings 52 or 54, thus increasing the drag through the coupling for purposes of damping action, over-load control, irreversibility or other features as may be desired.

As an example, force applied to shaft 10 rotating it in a clockwise direction, as seen in Fig. 1, for moving a load P applied through load band 34 to the load shaft 12, also moves the load shaft in a clockwise direction. If both brakes are set or engaged with the rings 56 and 58, then the slide 141 will rotate the ring 54 in its bearings 62, but there will be sliding movement between the slide 140 and the friction ring 52 since the torque is exerted in a direction against the brake 72. The force to be applied therefore must be the sum of the resistance to movement of the load P plus the friction force F at the sliding parts 140 and 52, whose coefficient is designated Mu. The clockwise movement of the slides 140, 141 drives the shaft 12 through the load arm 32 with the load band 34 at a distance G from the center of shaft rotation. Stopping rotation of the drive shaft 10 stops rotation of the load shaft 12, where it is to be held against movement in either direction by the friction of the slides and friction rings.

For reversibility, the load L must react through the load band 34 at the distance of the movement arm G. If the load band 34 is moved to a different position along the arm 32 which changes the moment arm to G' then a different drag reaction of reversibility will obtain. That can be demonstrated by reference to Fig. 4, a force diagram of the construction shown in Fig. 1, and where C represents the center of rotation of the shafts 10 and 12, with the line C—B extending in the direction of the load arm 32, and the arc 14 referring to the line of slippage between the elements 141 and 54, or 140 and 52. Here for irreversibility, the load L reacts through moment arm G at the point 34 tending to turn the coupling in the counter-clockwise direction against the action of the brake. The force of the load is transmitted to the slide surface at S, as force P opposing the load, resulting in a force $P_n$ normal to the point of application S on the arc 14, and force F representing the turning moment on the coupling plate. In order for the coupling to turn under the urge of the reversing load it must slide at the point of contact with the friction ring 54. There is a coefficient of friction mu or mu' between the surfaces which generate a friction force $f$ controlling the angle alpha of the slide surface to the direction of load reversing force. The friction force $f$ can be made to overcome the torque force F so that no motion of the coupling will take place, giving a relation of irreversibility.

Figure 4:
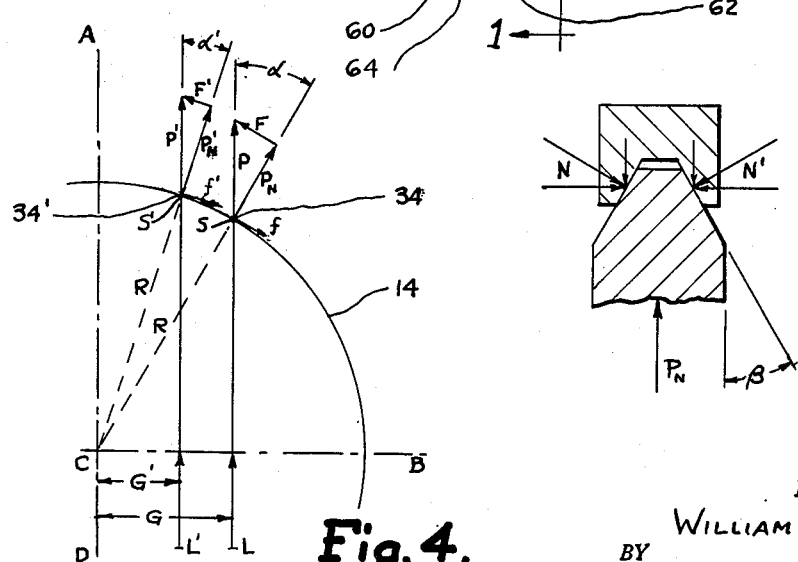
Fig. 4 is a force diagram illustrating the relations of component parts of my variable drag coupling.

Adopting P and alpha as of some definite values, the values of the other forces can be found, by known formulae, as shown in Figs. 2 and 4 where:

$$P_n = P \cos \alpha$$
$$F = P \sin \alpha$$
$$f = \mu P_n$$

To prevent motion with brake set;

$$f \geq F$$

substituting:

$$\mu P_n \geq P \sin \alpha$$

substituting for $P_n$ $$\mu P \cos \alpha \geq P \sin \alpha$$

divide by $P \cos \alpha$ $$\mu \geq \frac{P \sin \alpha}{P \cos \alpha} = \tan \alpha$$

or $\tan \alpha = \mu$

Also definite relations obtain, as in similar triangles.

$$\frac{F}{P} = \frac{G}{R}; \text{ and } F = \frac{GP}{R}$$

Now consider that the load band 34 is moved radially inward to the point 34' where the same reversing load is acting through the moment arm G'. Then, $$\frac{F'}{P} = \frac{G'}{R}; \text{ and } F' = \frac{G'P}{R}$$

The values of P and R are the same in both instances, and the value of G' is less than the value of G, wherefore the value of $$\frac{G'P}{R}$$

is less than $$\frac{GP}{R}$$

and F' is less than F. The coefficient of friction between the sliding surfaces at 14 remains the same, but $P'_n$ is slightly greater than $P_n$ since $\cos x'$ is greater than $\cos \alpha$ and $$P'_n = P' \cos x' (P' = P)$$

Therefore $f'$ is greater than $f$ since $$f' = \text{mu } P'_n \text{ and } f = \text{mu } P_n$$

From the above it is seen that the new position of the load band results in a reduced driving force F' and an increased friction force $f'$, thereby greatly increasing the effectiveness of the brake. Moving the load band 34 along the arm 32 to other positions results in corresponding changes in the drag relation.

Figure 5:
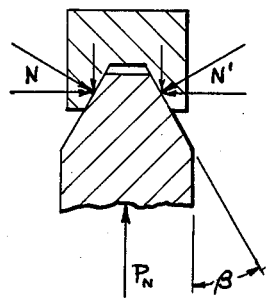
Fig. 5 is a diagram relating to the frictional engagement of the improved coupling.

Selection of metals and materials will alter the frictional relations between the slide and ring, and if the coefficient of friction mu is not high enough for conventional brake surfaces, it may be effectively increased by making the bearing surfaces at S in the form of a V-groove. Then, the normal force $P_n$ is resolved into normal forces N and N', and the following relationships apply, as shown in Figs. 4 and 5.

let $f'$ = the friction force resulting
let $\mu$ = true coefficient of friction of the surfaces
N and N' are equal in a symmetrical groove $$P_n = 2N \sin \beta$$

$$N = \frac{P_n}{2 \sin \beta}$$

the friction on one surface $= \mu N$
Two surfaces are acting, therefore $$f' = 2\mu N$$

$$\mu' = \frac{f'}{P_n} = \frac{2\mu N}{2N \sin \beta} = \frac{\mu}{\sin \beta}$$

For balance of the bearing torques, the same relationship is true as before.

$$\tan \alpha = \mu' = \frac{\mu}{\sin \beta}$$

Since $\sin \beta$ is always less than 1 for any angle other than 90°, then $\tan \alpha$ is larger and $\alpha$ is larger.

Thus, by means of the V groove it is easier to obtain dimensional relationships permitting of better proportions and easier construction of component parts of the device.

The foregoing coupling is particularly adaptable in aircraft constructions where fail-safe and position-feel properties are desired. With the brakes set, control surfaces can be adjusted to a fine point with assurance of irreversible positioning. Flutter and backlash are eliminated. The feel of adjustment is transmitted to the pilot, and the control surface remains at the adjustment made until subsequently changed. If a reverse adjustment is desired it is easily accomplished by backing off of the control member, that is, by moving it in a direction to assist the reversing load force.

I claim:

1. A power transmitting means, comprising in combination, a power shaft and a load shaft in substantial alignment, both of said shafts having a radially extending arm, a coupling plate having a plurality of notches each engaging an arm of said shafts for transmitting rotary motion of one shaft to the other, disengageable brake means operating upon the coupling plate for selectively restraining rotation of the shafts in either direction, and means operable upon the brake means for controlling the rotation of both shafts.

2. A power transmitting means, comprising in combination, a power shaft and a load shaft in substantial alignment, both of said shafts having a radially extending arm, a coupling plate having a plurality of notches each engaging an arm of said shafts for transmitting rotary motion of one shaft to the other, means frictionally engaging the coupling plate and normally rotatable therewith permitting free movement of the shafts, antifriction means supporting the frictionally engaging means, and selectively operable brake means for controlling the shaft rotation in either direction.

3. A power transmitting means, comprising in combination, a power shaft and a load shaft in substantial alignment, both of said shafts having a radially extending arm, a coupling plate having a plurality of notches each engaging an arm of said shafts for transmitting rotary motion of one shaft to the other, said plate having oppositely disposed arcuate edges concentric with the axes of said shafts, a friction ring engaging each said edge of the coupling plate, a support providing a bearing for each friction ring, means engaging the friction ring for restraining its rotation in one direction, and means controlling the restraining means to permit free rotation of the friction ring in its bearing, or to enforce frictional rotation of the coupling plate within the friction ring.

4. The combination set forth in claim 1, wherein, means embracing one shaft arm and plate notch are adjustable radially of the shaft axis for modifying the moment arm through which the respective shaft and coupling plate act.

5. A variable drag coupling, comprising in combination, a rigidly supported casing, a pair of aligned shafts journalled in said casing and shaft having a radially extending arm, a slide plate having driving engagement with both shafts in such manner that rotation of one shaft rotates the other shaft, a drive band slidable along one of the shaft arms and engaging the slide plate for varying the driving engagement between the slide plate and that shaft, a slide rail frictionally engaging the slide plate for increasing the resistance to shaft rotation, antifriction bearings for supporting the slide rail from the casing, and releasable brakes carried by the casing and operable upon the side rail for controlling the resistance of shaft rotation.

6. The combination set forth in claim 5, wherein manually actuated means control the releasable brake means to effect free rotation of the coupled shafts in either direction or to effect free rotation of the shafts in one direction and rotation with increased resistance in the other direction.

7. The combination set forth in claim 5, wherein, manually actuated means selectively actuate the brakes to effect free rotation of the coupling in either direction on the antifriction bearings, or to effect slidable rotation of the slide plate within the slide rails.

8. A variable drag coupling, comprising in combination, a rigidly supported casing, a pair of aligned shafts journalled in said casing and shaft having a radially extending arm, a slide plate having driving engagement with both shafts in such manner that rotation of one shaft rotates the other shaft, said slide plate having oppositely disposed arcuate edges concentric with said shafts, circular slide rails frictionally engaging the edge portions of said slide plate to provide drag rotation of the plate within the rails, antifriction bearings on the casing for rotatably supporting the slide rails, brakes carried by the casing, spring means for urging the brakes into engagement with the slide rails to prevent free rotation of the rails when either shaft is rotated, and means for releasing either of the brakes to effect free rotation of the shafts in one direction or the other.

9. The combination set forth in claim 8, wherein the frictional engagement of the slide plate and slide rail include complementary groove and tongue portions, the frictional coefficient for sliding movement between which is great enough to resist reverse movement of the load on the driven shaft with the corresponding brake engaged.

WILLIAM H. KUNTZ.

REFERENCES CITED

The following references are of record in the file of this patent:

UNITED STATES PATENTS

| Number | Name | Date |
| --- | --- | --- |
| 2,209,122 | Houplain | July 23, 1940 |
| 2,525,402 | Dehn | Oct. 10, 1950 |